F. J. LIBBY.
CAR STAKE.
APPLICATION FILED AUG. 25, 1913.
1,129,834. Patented Feb. 23, 1915.
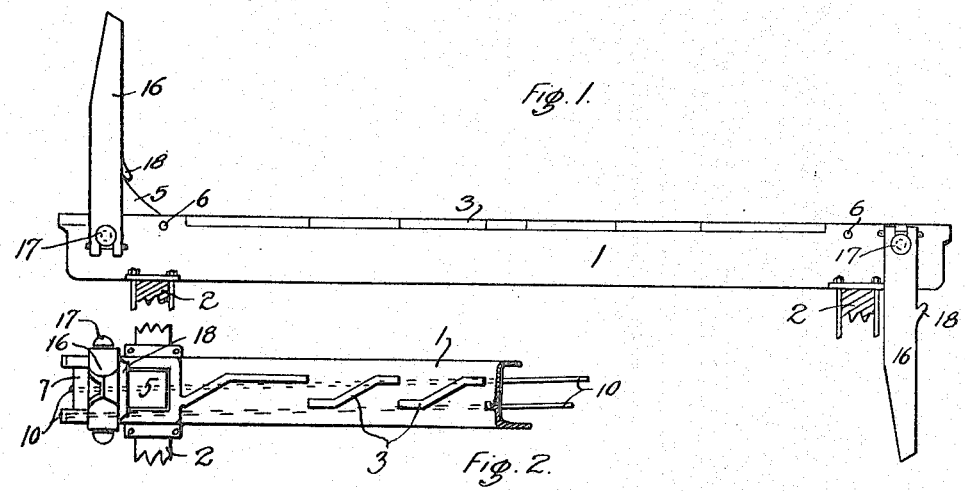
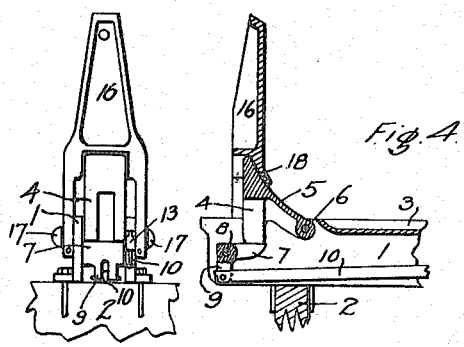
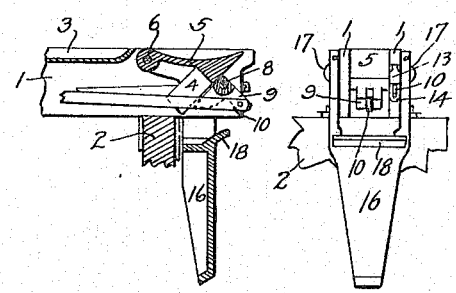
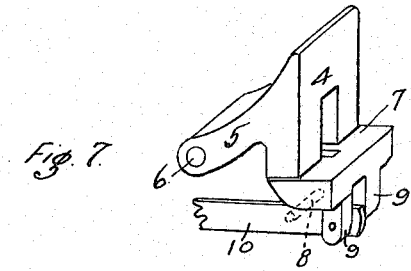
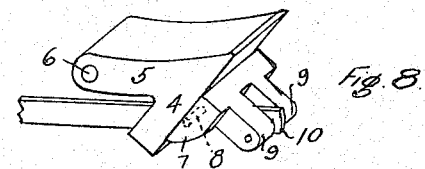
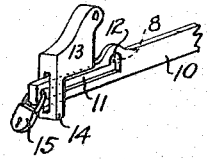
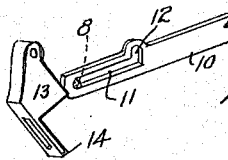
WITNESSES:
F. Grotheim
A. A. Allen
INVENTOR
Frederick J. Libby
BY
R. J. Elliott
ATTORNEY

UNITED STATES PATENT OFFICE.

FREDERICK J. LIBBY, OF TACOMA, WASHINGTON, ASSIGNOR TO TURTLE-BACK LOG BUNK & CAR STAKE COMPANY, OF TACOMA, WASHINGTON, A CORPORATION OF WASHINGTON.

CAR-STAKE.

1,129,834. Specification of Letters Patent. Patented Feb. 23, 1915.

Application filed August 25, 1913. Serial No. 786,364.

*To all whom it may concern:*

Be it known that I, FREDERICK J. LIBBY, a citizen of the United States, and a resident of Tacoma, in the county of Pierce and State of Washington, have invented certain new and useful Improvements in Car-Stakes, of which the following is a specification.

This invention relates to car stakes and especially to stakes for use on logging cars and has special reference to improvements in my Patent #1,057,563 dated April 1st, 1913.

The objects of the invention are to provide improved means for supporting the stake in operative position; for releasing the stake from said position; and for holding said supporting means in operative position in spite of jars and vibrations incident to transportation.

Other objects are to improve the means for preventing a longitudinal motion of the logs on the bunk, and to provide an efficient, strong and economical means for holding the logs on the car.

I attain these and other objects by the devices, mechanisms and arrangements illustrated in the accompanying drawings, in which—

Figure 1 is a side elevation of a bunk having my improved stakes mounted thereon, showing one such stake in operative position while the stake at the other end of the bunk is released; Fig. 2 is a plan view of my improved bunk and stake, showing the stake in operative position; Figs. 3 and 4 are respectively end elevation and vertical longitudinal section of my improved bunk with the stake shown in operative position thereon; Figs. 5 and 6 are similar views on the other end of the bunk, showing the stake in released position; Figs. 7 and 8 are perspective views showing the low stake and its supporting means, respectively in operative and released positions; and Figs. 9 and 10 are perspective views showing the outer end of the controlling bar and its locking means, respectively in operative and released positions.

Similar numerals of reference refer to similar parts throughout the several views.

The bunk 1 is preferably made in inverted U-shape, having each end slotted to receive the low stake. The said ends of the bunk extend out beyond the side sills 2 of the car. The bunk is secured to the said sills by means of suitable bolts passing through flanges formed at each end of the bunk. The top of the bunk 1 is substantially flat but has a series of ridges 3 extending above its upper surface; each of said ridges consisting of two parallel end parts, arranged in different transverse and longitudinal lines, said parallel parts being joined by an inclined or diagonal part. Therefore when the logs lie on the bunk they are engaged by the said ridges 3, which dig into the bark and which prevent their end and side motions thereon.

The low stake consists of a vertical portion 4 having a curved radius arm 5 extending from its upper end to the pivot 6 which secures it to the bunk 1. The stake lies in the above-mentioned slot in the end of the bunk, and extends upward therefrom when in its operative position (Fig. 4) but lies within the slot, below the level of the top of the bunk, when in its released position (Fig. 5). The part 4 has a slot extending upward from its lower end thus forming two feet which straddle the controlling rod when in the released position (Fig. 5). The low stake is held in its operative position by means of a pivoted support. This support consists of a flat horizontal part 7 on which the ends of the vertical part 4 of the low stake rest, said part extending inward from the horizontal pivot 8 and being slotted to allow it to pass over the controlling rod, and the lever arms 9 which may be substantially at right angles to the part 7 and which are pivotally secured to the end of the controlling rod 10 by means of a suitable bolt. The downward force on the low stake tends to turn the part 7 out of its horizontal position thus causing the arms 9 to pull on the controlling rod 10.

The controlling rod 10 runs across the car in the interior of the bunk 1, on a slightly diagonal line (Fig. 2), passing out of the end of the bunk beside the stake on that side of the car. Referring particularly to Figs. 9 and 10 it will be observed that the end of the rod 10 has a long slot 11 cut in it, said slot having an offset 12 at its inner end. The pivot pin 8 of the stake support at that end of the bunk, passes through the slot 11 and fits in the offset 12 in a manner similar to that described in my above-mentioned patent. I however pivot, directly above the end of the rod 10, a dog 13 which engages the top of the rod when the pin 8 is in the offset 12 and prevents the rod from being raised, and which has a slotted downward extension 14 which passes over the end of the rod 12. The center of gravity of the dog 13 is positioned toward the end of the rod, relatively to its pivot, so that said dog will always tend to swing inward into position if it is displaced. The end of the rod 10 extends through the slot in the extension 14 a sufficient distance to allow the end of the slot 11 therein to extend beyond the outer face of the said extension, so that a removable locking means, such as the padlock 15 (Fig. 9), may be passed through the slot 11 to prevent the dog 14 from being removed from its engaging position, either accidentally or otherwise, without removing the said locking means. In order to release the stake controlled by the rod 10, it is thus necessary to remove the locking means 15, turn the dog 14 on its pivot out of the way of the rod, raise the end of the rod so that the pin 8 is removed from the offset 12, and then allow the rod 10 to slide toward the stake which it controls, the said pin 8 sliding in the slot 11 to the end thereof. This of course releases the low stake as above described.

The high stake 16, straddles the end of the bunk 1 and is supported by a pair of headed lugs 17 formed on the outside of said bunk. The upper end of the low stake engages a lip 18 formed on the inner side of said stake 16 to prevent said stake from falling outward so long as the low stake is held in operative position. When the low stake is released the high stake simply turns on the lugs 17 and hangs vertically downward from the bunk, outside of the side sill, being held on the said lugs 17 by any suitable means. Thus it will be seen that the high stake is very firmly held in operative position and is quickly removed out of the way of the logs before they have time to fall on it, and that in its released position it is protected by the end of the bunk from damage either in loading or unloading the logs and hangs high enough not to interfere with the free operation of the car.

Having described my invention, what I claim is:

1. In a logging car, the combination of a bunk extending across the car and supported thereby; a releasable stake at one end of said bunk and secured thereto; means for supporting said stake in operative position; a tension rod holding said stake and supporting means in engagement and extending across the car; fixed means mounted on the other end of the bunk and adapted to hold the tension rod from movement across the car; and means formed on said tension rod and adapted to removably engage said fixed holding means.

2. In a logging car, the combination of a bunk extending across the car and supported thereby; a stake pivoted to one end of said bunk and extending above it when in its operative position; a tension rod extending across the car; means connecting said tension rod with said stake whereby the downward motion of the stake is opposed by the tension in said rod; and releasable means engaging the other end of said rod to hold it against such tension.

3. In a logging car, the combination of a bunk extending across the car and supported thereby; a stake pivoted to said bunk and extending above it when in its operative position and having a portion extending down into the bunk in a vertical line outside of and entirely removed from its pivot point; a removable support engaging said downward extending portion whereby the stake is held in operative position; and releasable means for holding said support in engaging position.

4. In a logging car, the combination of a bunk extending across the car and supported thereby; a stake pivoted to said bunk and extending above it when in its operative position and having a portion extending down into the bunk; a support, engaging said downward extending portion whereby the stake is held in operative position, and pivoted to the bunk to one side of said downward extending portion whereby when said support is turned on its pivot it is withdrawn from the path of said downward extending portion; and releasable means for holding said support in engaging position.

5. In a logging car, the combination of a bunk extending across the car and supported thereby; a stake pivoted to said bunk and extending above it when in its operative position and having a portion extending down into the bunk; a support engaging said downward extension whereby the stake is held in operative position, and pivoted to the bunk to one side of said downward extension whereby when said support is turned on its pivot it is withdrawn from the path of said downward extension; a tension rod secured to said support and extending across the car therefrom; and releasable means on the other side of the car whereby said rod is held to hold said support in engaging position.

6. In a logging car, the combination of a bunk extending across the car and supported thereby; a releasable stake at one end of said bunk and secured thereto; means for supporting said stake in operative position; a tension rod holding said stake and supporting means in engagement and extending across the car, and having an offset slot in its free end; a bolt mounted on the bunk and passing through said offset slot and adapted to hold the tension rod from movement across the car when in engagement with the offset in said slot; and a dog pivoted to the bunk and engaging the rod whereby the bolt is held in engagement with the offset in said slot.

7. In a logging car, the combination of a bunk extending across the car and supported thereby; a releasable stake at one end of said bunk and secured thereto; means for supporting said stake in operative position; a tension rod holding said stake and supporting means in engagement and extending across the car, and having an offset slot in its free end; a bolt mounted on the bunk and passing through said offset slot and adapted to hold the tension rod from movement across the car when in engagement with the offset in said slot; a dog pivoted to the bunk and engaging the rod whereby the bolt is held in engagement with the offset in said slot; and a removable locking means passing through the rod and engaging the dog to prevent its removal from the rod.

FREDERICK J. LIBBY.

Witnesses:
M. F. McNEIL,
F. D. WILSON.

Copies of this patent may be obtained for five cents each, by addressing the "Commissioner of Patents, Washington, D. C."